C. B. Wagner,
Harvester Cutter,
No. 15203
Patented June 24, 1856
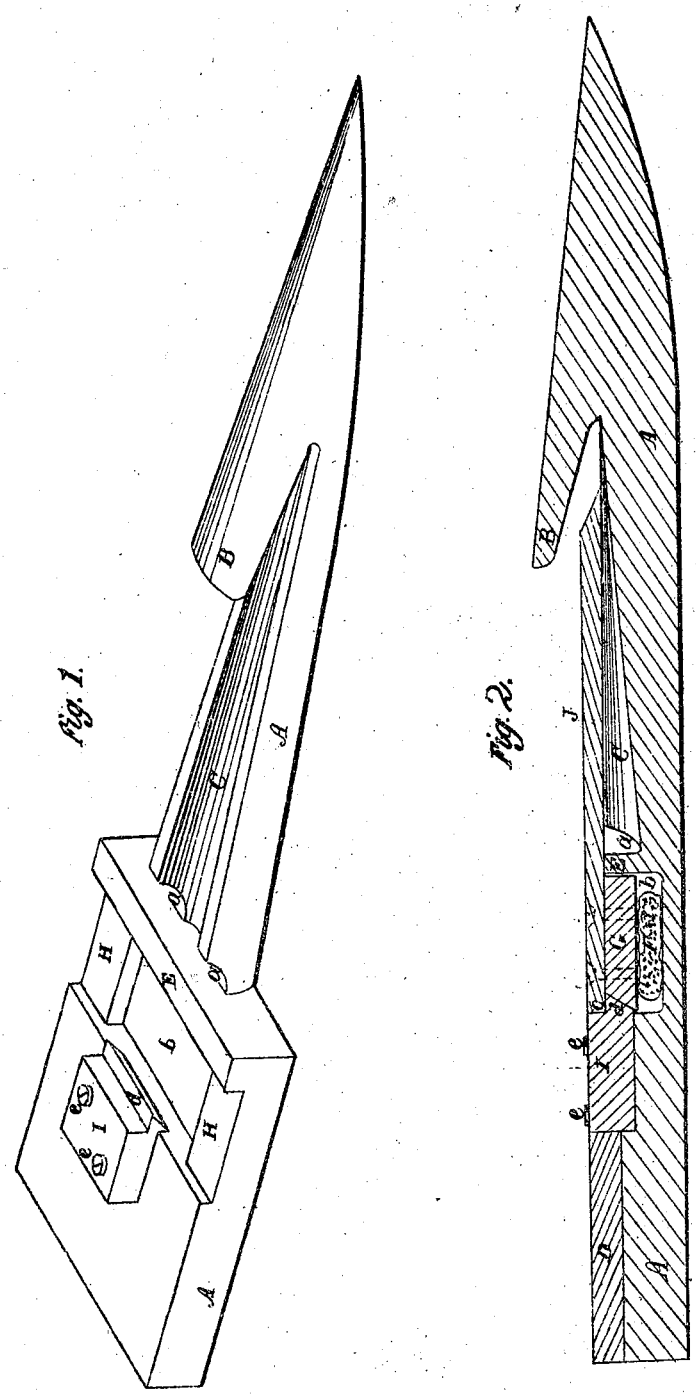

UNITED STATES PATENT OFFICE.

CYRIL B. WAGNER, OF PHILADELPHIA, PENNSYLVANIA.

IMPROVED CUTTING APPARATUS FOR HARVESTERS.

Specification forming part of Letters Patent No. 15,205, dated June 24, 1856.

*To all whom it may concern:*

Be it known that I, CYRIL B. WAGNER, of the city and county of Philadelphia, and State of Pennsylvania, have invented certain new and useful Improvements in the Cutting Apparatus of Harvesting-Machines; and I do hereby declare the following to be a full, clear, and exact description of the same, reference being had to the accompanying drawings, making a part thereof, in which—

Figure 1 represents a perspective view of one of the fingers or guards and finger-bar with the cutters removed to show the parts underlying them. Fig. 2 represents a longitudinal vertical section taken through one of the guards and showing the sickle and sickle-bar in cross-section.

Similar letters in the separate figures denote like parts in both.

The nature of my invention relates to the cutting apparatus, which embraces the finger or guard and its bar and the sickle or cutter and its bar, the combined operation of the two making the necessary gathering and cutting of the grain or grass.

To enable others skilled in the art to make and use my invention, I will proceed to describe the same with reference to the drawings.

A represents one of the fingers or guards, and B the cap under which the points or edge of the sickle moves. That portion of the tooth, guard, or finger underneath the sickle, as shown at C, is rounded out to form a hollow channel, said channel inclining toward the finger-bar D. At or near the heel of the channel or furrow C are openings $a$ $a$, made from the channel C, so as to allow any moisture or gummy matter that would otherwise accumulate under the sickle to drip off into the channel underneath and thence out of the openings $a$ $a$. That portion of the guard or finger which is united to the finger-bar is as follows:

E is a ledge, behind which a deep recess, $b$, is formed for containing oil or other lubricating compound, which may be held in a sponge, F. The sickle-bar G, which rests upon the shoulders H H on each side of the oil-reservoir $b$, is in contact with the sponge, and thus constantly lubricates the places it slides over and prevents friction and gumming.

I is a plate for holding the sickle J to its place while it vibrates over the fingers, as follows: The sickle-bar on its rear side is inclined (see Fig. 2) so that the heel $c$ of the sickle shall project over it. A projecting piece or lip, $d$, on the plate I fits into the space thus formed under $c$ and holds the bar and cutters from rising. The plate I is held to the finger-bar by screws $e$ $e$, so that the sickle can be readily removed for recharging the oil-reservoirs, or sharpening, or any other purpose.

Any number of fingers thus constructed are secured to the bar D, and when the sickle is placed therein form the cutting apparatus.

Having thus fully described my invention, I would state that I do not singly claim forming the finger or guard of a harvesting-machine with the hollow or depression C $a$; but

What I do claim as new, and desire to secure by Letters Patent, is—

Forming the finger or guard having said depression with an additional depression, as at $b$, and so uniting the sickle and sickle-bar thereto as to facilitate and render easy the cutting, substantially in the manner set forth.

C. B. WAGNER.

Witnesses:
  JNO. B. KENNEY,
  JOHN WILCOX.